(12) United States Patent
Kawano

(10) Patent No.: US 8,768,052 B2
(45) Date of Patent: Jul. 1, 2014

(54) IMAGE PROCESSING APPARATUS, IMAGE PROCESSING METHOD, AND NON-TRANSITORY COMPUTER READABLE MEDIUM

(75) Inventor: Hiroyuki Kawano, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 142 days.

(21) Appl. No.: 13/405,875

(22) Filed: Feb. 27, 2012

(65) Prior Publication Data

US 2013/0058569 A1 Mar. 7, 2013

(30) Foreign Application Priority Data

Sep. 5, 2011 (JP) .................................. 2011-193286

(51) Int. Cl.
*G06K 9/00* (2006.01)

(52) U.S. Cl.
USPC .......................................... 382/165; 382/190

(58) Field of Classification Search
USPC ................................................. 382/165, 190
See application file for complete search history.

(56) References Cited

U.S. PATENT DOCUMENTS

| | | | | |
|---|---|---|---|---|
| 7,450,783 B2* | 11/2008 | Talapov et al. | ............... | 382/286 |
| 7,949,184 B2* | 5/2011 | Itoh | ............... | 382/167 |
| 8,064,522 B2* | 11/2011 | Kondo et al. | ............ | 375/240.16 |
| 2007/0253618 A1* | 11/2007 | Kim et al. | ..................... | 382/154 |
| 2007/0253623 A1* | 11/2007 | Ohira et al. | .................... | 382/218 |
| 2008/0310729 A1* | 12/2008 | Yoshino | ........................ | 382/194 |
| 2011/0148897 A1* | 6/2011 | Wong et al. | .................... | 345/582 |
| 2013/0058569 A1* | 3/2013 | Kawano | ........................ | 382/165 |

FOREIGN PATENT DOCUMENTS

| JP | A-63-028174 | 2/1988 |
|---|---|---|
| JP | A-11-155067 | 6/1999 |
| JP | A-2004-200746 | 7/2004 |
| JP | A-2004-213298 | 7/2004 |
| JP | A-2005-190383 | 7/2005 |

* cited by examiner

Primary Examiner — Gregory M Desire
(74) Attorney, Agent, or Firm — Oliff PLC

(57) ABSTRACT

An image processing apparatus includes a feature point extraction unit that extracts feature points which are pixels located at the corner of a region within an image and directions indicating a positional relationship of the feature points in the region, a selection unit that selects the feature point and a set of feature points corresponding to the feature point, based on a color of the feature point, a position of the feature point, and a direction in the feature point, a representative point determination unit that determines a representative point representing a region, based on the set of feature points, a vector calculation unit that calculates a vector composed of two representative points, on the basis of the representative points, and a screen line number and angle extraction unit that extracts the number of screen lines and an angle used in the image, based on a distribution of the vectors.

19 Claims, 20 Drawing Sheets

2401

2501

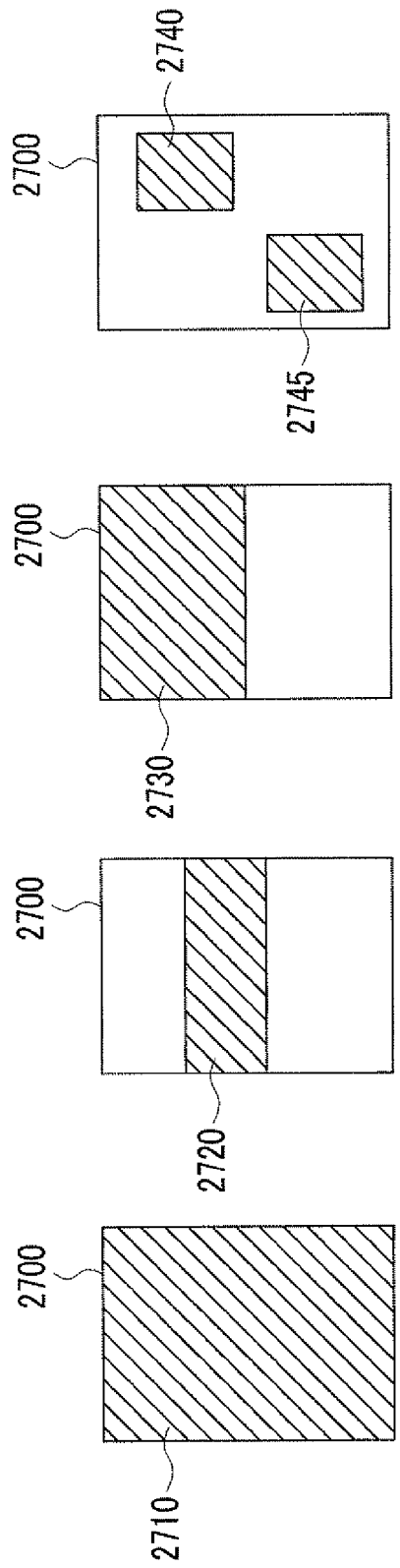

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-193286 filed Sep. 5, 2011.

BACKGROUND (i) Technical Field

The present invention relates to an image processing apparatus, an image processing method, and a non-transitory computer readable medium.

(ii) Related Art

There are techniques relating to screen processing.

SUMMARY

According to an aspect of the invention, there is provided an image processing apparatus including: a feature point extraction unit that extracts feature points which are pixels located at the corner of a region within an image and directions indicating a positional relationship of the feature points in the region; a selection unit that selects the feature point and a set of feature points corresponding to the feature point, on the basis of a color of the feature point extracted by the feature point extraction unit, a position of the feature point, and a direction in the feature point; a representative point determination unit that determines a representative point representing a region, on the basis of the set of feature points selected by the selection unit; a vector calculation unit that calculates a vector composed of two representative points, on the basis of the representative points determined by the representative point determination unit; and a screen line number and angle extraction unit that extracts the number of screen lines and an angle used in the image, on the basis of a distribution of the vectors calculated by the vector calculation unit.

BRIEF DESCRIPTION OF THE DRAWINGS

Exemplary embodiments of the present invention will be described in detail based on the following figures, wherein:

FIGS. 27A to 27D are explanatory diagrams illustrating an example of the target image.

DETAILED DESCRIPTION

Hereinafter, an example of one preferred exemplary embodiment for realizing the invention will be described with reference to the drawings.

Figure 1:
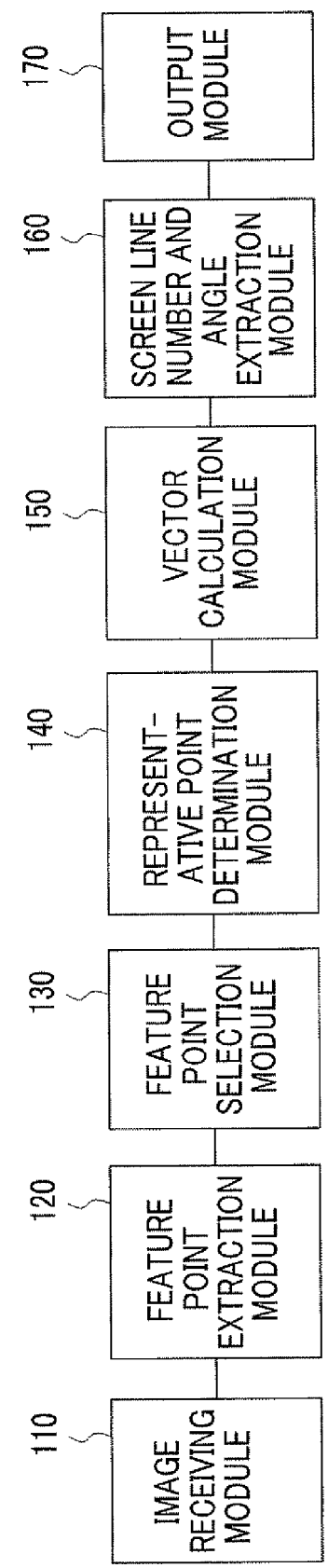
FIG. 1 is a conceptual module configuration diagram illustrating a configuration example of an exemplary embodiment.

FIG. 1 is a conceptual module configuration diagram illustrating a configuration example of an exemplary embodiment.

Meanwhile, a module indicates components such as hardware and software (computer program) capable of being separated generally logically. Therefore, the module in the exemplary embodiment indicates not only a module in a computer program, but also a module in a hardware configuration. Therefore, in the exemplary embodiment, a computer program for causing the components to function as these modules (a program for causing a computer to execute each procedure, a program for causing the computer to function as each unit, and a program for causing the computer to realize each function), systems and methods are all described. In addition, the modules may functionally correspond to each other one to one, but in the mounting, one module may be composed of one program, and plural modules may be composed of one program. Conversely, one module may be composed of plural programs. In addition, plural modules may be executed by one computer, and one module may be executed using plural computers by a computer in a dispersed or parallel environment. Meanwhile, another module may be contained in one module. In addition, hereinafter, "connection" is used not only for a physical connection, but also for a logical connection (transmission and reception of data, instructions, reference relationship between data, and the like). The term "predetermined" means that a determination is made before a target process, and means that when a process is before a target process not only before a process according to the exemplary embodiment starts, but also after the process according to the exemplary embodiment starts, the determination is made depending on the situation and the state at that time, or depending on the situation and the state until then.

In addition, a system or a device includes not only a configuration in which plural computers, pieces of hardware, devices and the like are connected to each other through communication units such as a network (including a one-to-one correspondence communication connection), but also a configuration in which they are realized by one computer, hardware, device and the like. Herein, the terms "device" and "system" are used as synonyms. Naturally, the term "system" does not include nothing more than a social "structure" (social system) which is an artificial organization.

In addition, when plural processes are performed for each process using each module or within the modules, target information is read from a storage device for each process, and after the process is performed, the processing result is written to the storage device. Therefore, the descriptions of reading from the storage device before the process and writing to the storage device after the process may be omitted. Meanwhile, the storage device herein may include a hard disk, a RAM (Random Access Memory), an external recording medium, a storage device using a communication line, a register within a CPU (Central Processing Unit), and the like.

An image processing apparatus of the exemplary embodiment is an apparatus that extracts the number of screen lines and the angle which are used in an image, and includes an image receiving module 110, a feature point extraction module 120, a feature point selection module 130, a representative point determination module 140, a vector calculation module 150, a screen line number and angle extraction module 160, and an output module 170, as shown in the example of FIG. 1.

The image receiving module 110 is connected to the feature point extraction module 120. The image receiving module 110 receives a target image, and transfers the image to the feature point extraction module 120. The receiving of an image is, for example, by reading an image in a scanner, a camera and the like, by receiving an image from an external device through a communication line in a facsimile and the like, by reading out an image stored in a hard disk (including a hard disk connected through a network, in addition to a hard disk embedded in a computer) and the like. The image may be a binary image (image in which a so-called halftone region is represented by a screen, one pixel being represented by one bit) on which screen processing is performed. However, the binary image may be a color image composed of plural sheets of binary images. In addition, a multi-level image (including a color image) in which the received image is screen-processed and an image recorded on a recording medium such as paper is read using an imaging device such as a scanner may be converted into a binary image by performing binarization processing on the image. The image to be received may be one sheet, and may be plural sheets. In addition, the content of the image may be a document used in the business, an advertisement pamphlet and the like. The resolution of the image is not limited to, but may be, for example, 2400 dpi or the like.

A target screen is, for example, mainly a dot concentration-type dither screen. Particularly, the screen is applied to an image on which a chain dot screen (screen becoming a mesh in which square dots are obliquely deformed and rhombic dots are connected to each other in a chain shape) processing is performed. However, in the case of a dot distribution-type dither screen, an error diffusion screen, an FM (Frequency Modulation) screen, a line screen, and the like, the screen line number and angle extraction module 160 determines that the image is not a dot concentration-type dither screen, and may output information indicating this point (information indicating that the target image is not a dot concentration-type dither screen).

The feature point extraction module 120 is connected to the image receiving module 110 and the feature point selection module 130. The feature point extraction module 120 receives a target image from the image receiving module 110, and extracts feature points which are pixels located at the corner of a region within the image and directions indicating the positional relationship of the feature points in the region. Hereinafter, the direction is also referred to as a tilt direction.

Herein, "region within the image" is referred to as a region composed of coupled black pixels or a region composed of coupled white pixels.

In addition, "pixels located at the corner of the region" are pixels existing within the region, pixels existing at the position in which the region is in contact with another region (for example, when the target region is a region of black pixels, "another region" is referred to as a region of white pixels which are in contact with the target region), and pixels existing at the apex when the region is polygonal. However, a step difference pixels simply generated by the slope of the straight line, noise and the like is not termed the corner.

In addition, regarding "directions indicating the positional relationship of feature points in the region", for example, when feature points exist at the upper-right corner within the region, the directions in the feature points are toward the lower left. As a specific example, when seen from the feature points, the direction is referred to as a direction toward the center (including the centroid or the like) of the region containing the feature points. However, the center of the region is not necessarily ahead of the direction, and the direction is preferably a direction determined by the positional relationship between the feature points and the pixels located around the feature points within the region containing the feature points. In addition, a predetermined pattern and a direction are associated with each other, and the direction may be extracted by a pattern matching process. Naturally, the direction preferably "indicates the positional relationship of the feature points in the region", and preferably a direction toward the feature points, for example, when seen from the center of the region containing the feature points. In this case, when the feature point exists at the upper-right corner within the region, the direction in the feature point is toward the upper right. In a description, when seen from the feature point, the direction toward the center of the region containing the feature point is exemplified.

In addition, as the extraction of the feature point, the feature point extraction module 120 may perform any of the following three processes, and may perform a combination of two or more processes.

(1) To extract a feature point on the basis of an angle formed by the lines linking the feature point and plural pixels located around the feature point in a region containing the feature point.

(2) To extract a feature point on the basis of the positional relationship between the feature point and plural pixels located around the feature point in a region containing the feature point.

(3) To extract a feature point on the basis of whether a region containing the feature point and a predetermined pattern are in accord with each other.

In addition, the feature point extraction module 120 may extract a direction determined by the positional relationship between the feature point and plural pixels located around the feature point in a region containing the feature point.

The feature point selection module 130 is connected to the feature point extraction module 120 and the representative point determination module 140. The feature point selection module 130 selects a feature point and a set of feature points corresponding to the feature point, on the basis of the color of the feature point extracted by the feature point extraction module 120, the position of the feature point, and the direction in the feature point.

Specifically, the feature point satisfying the following three conditions is selected.

(1) The colors of the feature points are the same as each other (when the color of a target feature point is black, the color of a corresponding feature point is also black, and when the color of the target feature point is white, the color of the corresponding feature point is also white).

(2) The feature points have a predetermined positional relationship therebetween (specifically, for example, when the direction of the target feature point is a right direction (including a lower right direction and an upper right direction), the corresponding feature point is located at the right of the target feature point; when the direction of the target feature point is a left direction (including a lower left direction and an upper left direction), the corresponding feature point is located in the left direction of the target feature point; when the direction of the target feature point is an upper direction (including an upper right direction and an upper left direction), the corresponding feature point is located at the upper side of the target feature point; and when the direction of the target feature point is a lower direction (including a lower right direction and a lower left direction), the corresponding feature point is located at the lower side of the target feature point).

(3) The direction in the feature point is toward the center of the same region (specifically, for example, when the direction of the target feature point is a lower right direction, and the corresponding feature point is located at the lower right from the target feature point, the direction of the corresponding feature point is an upper left direction).

The representative point determination module 140 is connected to the feature point selection module 130 and the vector calculation module 150. The representative point determination module 140 determines a representative point representing the region, on the basis of a set of feature points selected by the feature point selection module 130. That is, the representative point determination module 140 calculates the centers of individual halftone dots. More specifically, the center of the halftone dot is determined as a representative point by calculating the average value (intermediate point between the feature points) of the coordinates of a set of feature points selected by the feature point selection module 130.

The vector calculation module 150 is connected to the representative point determination module 140, the screen line number and the angle extraction module 160. The vector calculation module 150 calculates a vector composed of two representative points, on the basis of the representative points determined by the representative point determination module 140.

In addition, the vector calculation module 150 may be configured to select a reference representative point of the representative points determined by the representative point determination module 140 as a first representative point, select the representative point between a first distance and a second distance predetermined from the reference representative point as a second representative point, and calculates a vector composed of the first representative point and the second representative point. Further, the vector calculation module 150 may select the representative point between the first distance and the second distance as the second representative point, within rectangular regions adjacent to each other with the first representative point used as a corner. There are four types of rectangular regions adjacent to each other of a combination of the rectangular region located at the upper left and the rectangular region located at the upper right, a combination of the rectangular region located at the upper right and the rectangular region located at the lower right, a combination of the rectangular region located at the lower right and the rectangular region located at the lower left, and a combination of the rectangular region located at the lower left and the rectangular region located at the upper left, with respect to the first representative point.

The screen line number and angle extraction module 160 is connected to the vector calculation module 150 and the output module 170. The screen line number and angle extraction module 160 extracts the number of screen lines and the angle used in the image received by the image receiving module 110, on the basis of the distribution of the vectors calculated by the vector calculation module 150.

In addition, when the difference between the extracted number of screen lines or angle and a predetermined number of lines or angle is in a predetermined relationship, the screen line number and angle extraction module 160 may extract the extracted number of screen lines or angle as the predetermined number of lines or angle.

The predetermined number of lines or angle is a value stored in a storage device, and is referred to as the number of screen lines or angle generally used. For example, there may be 100 lines, 150 lines, 200 lines and the like as the line number, and there may be 0 degrees, 45 degrees, 90 degrees and the like as the angle. In addition, there may be plural predetermined numbers of lines or angles.

The predetermined relationship corresponds to a case where the difference is equal to or less than a predetermined threshold.

As the relationship between the extracted number of screen lines or angle and the predetermined number of lines or angle, there are (1) the relationship between the extracted number of screen lines and the predetermined number of lines, (2) the relationship between the extracted angle of the screen and the predetermined angle, and (3) the relationship between the extracted number of screen lines and the predetermined number of lines, and the extracted angle of the screen and the predetermined angle.

The output module 170 is connected to the screen line number and angle extraction module 160. The output module 170 outputs the number of screen lines and the angle extracted by the screen line number and angle extraction module 160. The output includes, for example, writing to an image storage device such as an image database corresponding to the image received by the image receiving module 110 (for example, as an attribute of the image), storage in a storage medium such as a memory card, transfer to another information processing apparatus, and the like. Another image processing apparatus receiving the number of screen lines and the angle performs, for example, a process of multivaluing a binary image received by the image receiving module 110, a process of separating the image into a letter region and a region (for example, photograph or the like) on which screen processing is performed, and the like.

Figure 2:
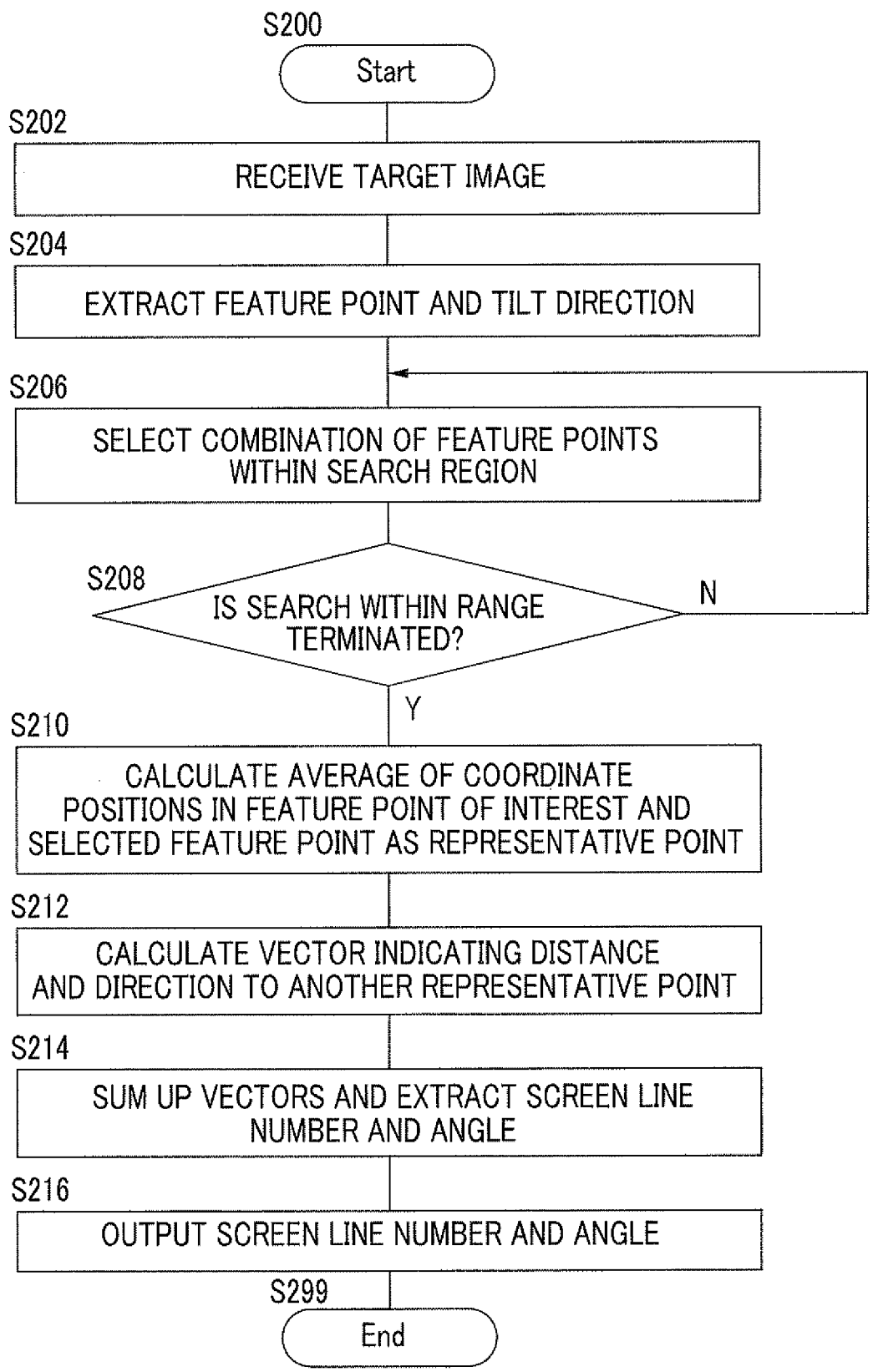
FIG. 2 is a flow diagram illustrating a process example according to the exemplary embodiment.

FIG. 2 is a flow diagram illustrating a process example according to the exemplary embodiment.

Figure 3:
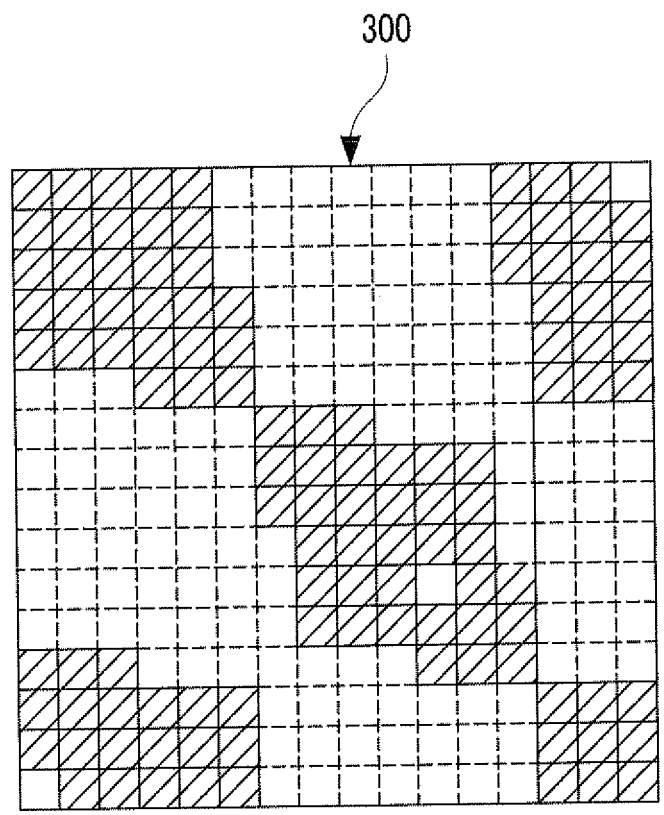
FIG. 3 is an explanatory diagram illustrating an example of a target image.

In step S202, the image receiving module 110 receives a target image. For example, a target image 300 shown in FIG. 3 is a portion of the image received by the image receiving module 110. The diagonal line portion is a region of black pixels, and the white portion is a region of white pixels.

Figure 4:
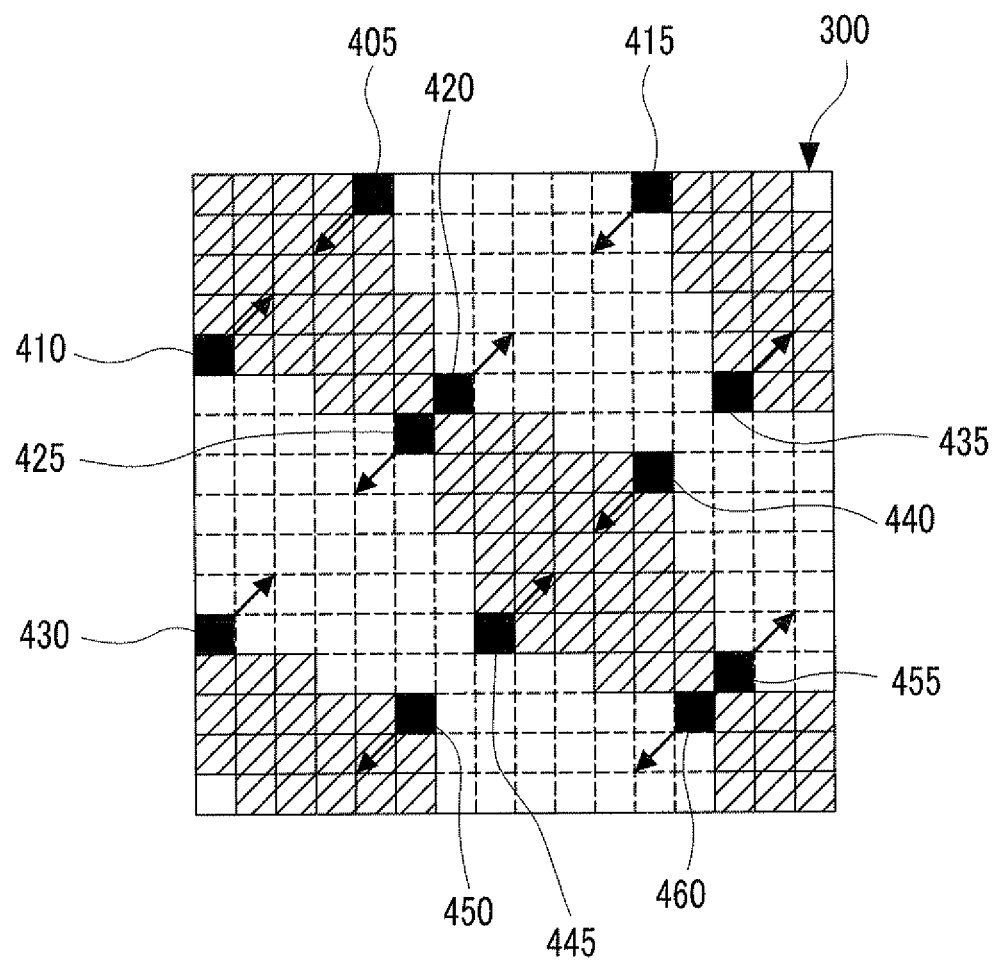
FIG. 4 is an explanatory diagram illustrating an example of feature points and tilt directions in the feature points.

In step S204, the feature point extraction module 120 extracts feature points and tilt directions thereof. FIG. 4 is an explanatory diagram illustrating an example of feature points and tilt directions in the feature points. As the extraction result, in the target image 300, there are a feature point 405 of which the tilt direction is a lower left direction, a feature point 410 of which the tilt direction is an upper right direction, a feature point 415 of which the tilt direction is a lower left direction, a feature point 420 of which the tilt direction is an upper right direction, a feature point 425 of which the tilt direction is a lower left direction, a feature point 430 of which the tilt direction is an upper right direction, a feature point 435 of which the tilt direction is an upper right direction, a feature point 440 of which the tilt direction is a lower left direction, a feature point 445 of which the tilt direction is an upper right direction, a feature point 450 of which the tilt direction is a lower left direction, a feature point 455 of which the tilt direction is an upper right direction, and a feature point 460 of which the tilt direction is a lower left direction.

A process of extracting feature points using the feature point extraction module 120 will be described with reference to FIGS. 5 to 14. As described above, there are three types of extraction methods.

(1) A feature point is extracted on the basis of an angle between the lines linking the feature point to plural pixels located around the feature point in a region containing the feature point. A description will be made with reference to FIGS. 5 to 10. When the following three conditions (1A), (1B), and (1C) are satisfied, a pixel of interest is determined as a feature point (that is, pixel existing at the corner in the region thereof). When any of the conditions are not satisfied, it is determined that the pixel is not a feature point.

(1A) Adjacent pixels to a pixel of interest (pixel 510 of interest or pixel 810 of interest which is a black pixel in FIGS. 5 to 10) are scanned in a predetermined direction (for example, clockwise), and one continuous region (continuum) within four pixels having the same color as that of the pixel of interest exists.

Figure 5:
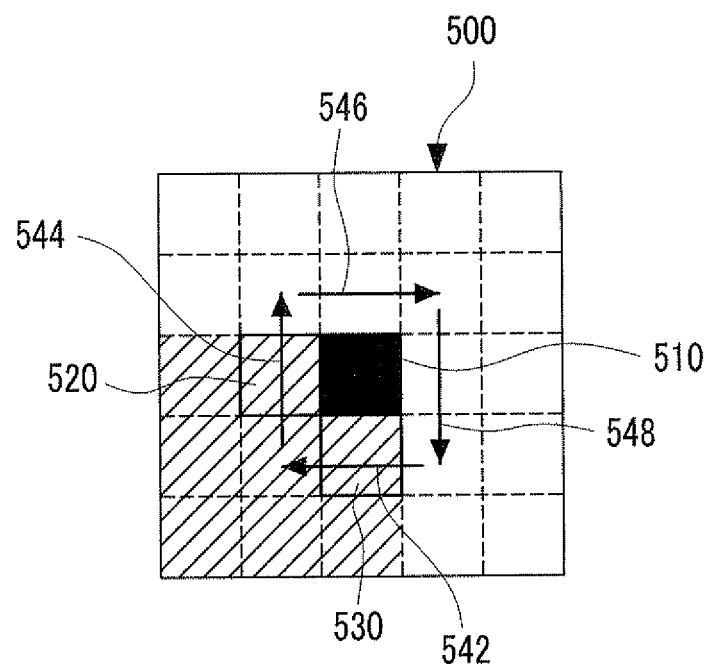
FIG. 5 is an explanatory diagram illustrating a process example for extracting the feature point.
Figure 6:
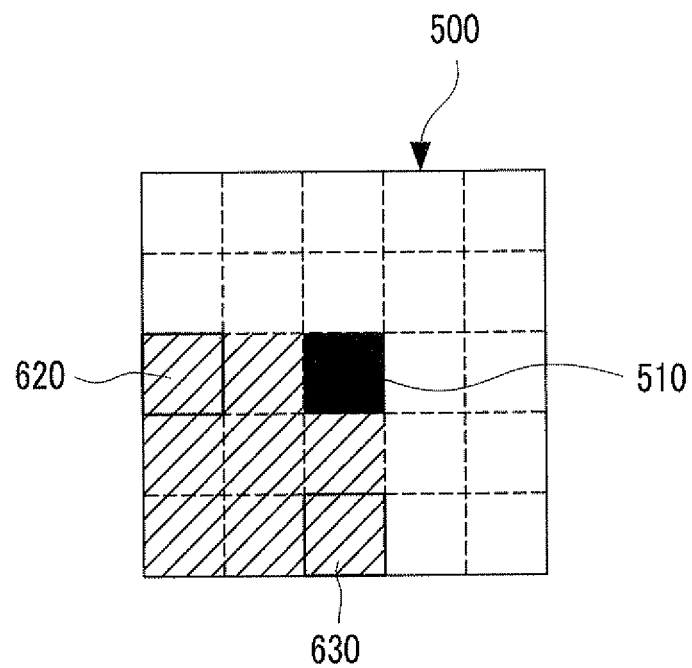
FIG. 6 is an explanatory diagram illustrating a process example for extracting the feature point.

In the example of FIG. 5, the circumference of the pixel 510 of interest is scanned in detection directions 542, 544, 546, and 548, and there is a continuum of pixels (pixels located at the lower side, the lower left, and the left with respect to the pixel 510 of interest) having the same color (black) as that of the pixel 510 of interest. Since the number of these pixels is three, the number of pixels is in the range of four. Therefore, the example of FIG. 5 satisfies the condition of (1A).

Figure 8:
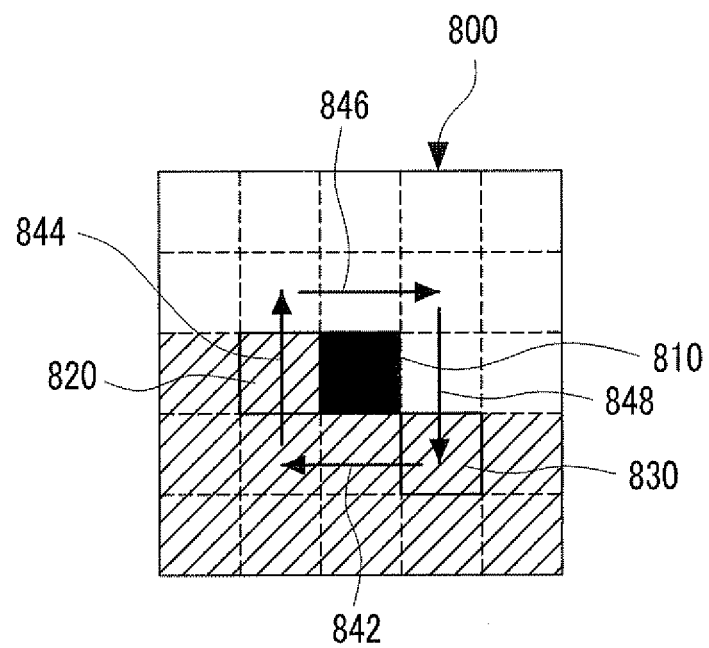
FIG. 8 is an explanatory diagram illustrating a process example for extracting the feature point.
Figure 9:
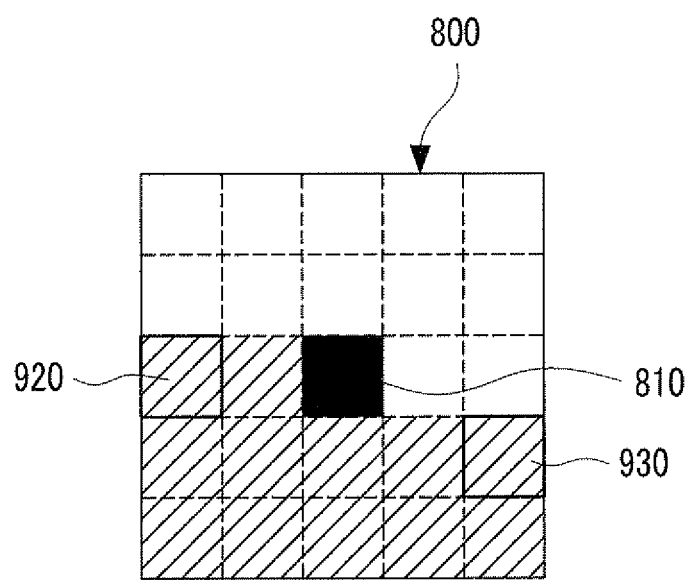
FIG. 9 is an explanatory diagram illustrating a process example for extracting the feature point.

In the example of FIG. 8, the circumference of the pixel 810 of interest is scanned in detection directions 842, 844, 846, and 848, and there is a continuum of pixels (pixels located at the lower right, the lower side, the lower left, and the left with respect to the pixel 810 of interest) having the same color (black) as that of the pixel 810 of interest. Since the number of these pixels is four, the number of pixels is in the range of four. Therefore, the example of FIG. 8 satisfies the condition of (1A).

(1B) Pixels may be detected which are adjacent pixels to a boundary pixel of the above-mentioned continuum, are change points of the color of the outermost pixels of a 5×5 block centering on the pixel of interest, and have the same color as that of the pixel of interest. The "boundary pixel of the continuum" is a pixel within the continuum (that is, a pixel having the same color as that of the pixel of interest), and is referred to as a pixel of which the color changes from a color of the pixel different from that of the pixel of interest to the same color as that of the pixel of interest in the above-mentioned scanning direction, or a pixel of which the color changes from the same pixel color as that of the pixel of interest to a color different from that of the pixel of interest in the above-mentioned scanning direction.

In the example of FIG. 5, the boundary pixels of the continuum are boundary pixels 530 and 520. The pixel which is an adjacent pixel to the boundary pixel 530, is a change point of the color of the outermost pixels of the 5×5 block centering on the pixel 510 of interest, and has the same color as that of the pixel 510 of interest is a detection pixel 630 illustrated in FIG. 6. The pixel which is an adjacent pixel to the boundary pixel 520, is a change point of the color of the outermost pixels of the 5×5 block centering on the pixel 510 of interest, and has the same color as that of the pixel 510 of interest is a detection pixel 620 illustrated in FIG. 6. Therefore, the example of FIG. 5 satisfies the condition of (1B).

In the example of FIG. 8, the boundary pixels of the continuum are boundary pixels 830 and 820. The pixel which is an adjacent pixel to the boundary pixel 830, is a change point of the color of the outermost pixels of the 5×5 block centering on the pixel 810 of interest, and has the same color as that of the pixel 810 of interest is a detection pixel 930 illustrated in FIG. 9. The pixel which is an adjacent pixel to the boundary pixel 820, is a change point of the color of the outermost pixels of the 5×5 block centering on the pixel 810 of interest, and has the same color as that of the pixel 810 of interest is a detection pixel 920 illustrated in FIG. 9. Therefore, the example of FIG. 8 satisfies the condition of (1B).

(1C) The angle between the line passing through the pixel of interest and the boundary pixel of the continuum and the line passing through the boundary pixel of the continuum and the detection pixel is equal to or less than 180 degrees, and the angle between the line passing through the pixel of interest and one detection pixel and the line passing through the pixel of interest and the other detection pixel is equal to or less than 135 degrees.

Figure 7:
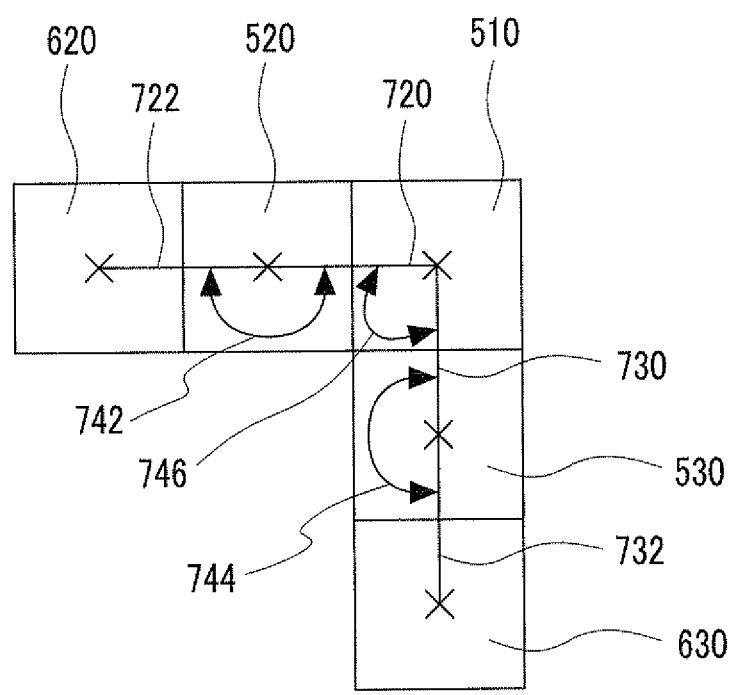
FIG. 7 is an explanatory diagram illustrating a process example for extracting the feature point.

Reference will be made to FIG. 7 to describe the lines linking the pixel of interest, the boundary pixel and the detection pixel to each other and the angle between the lines in the example of FIG. 5.

A connecting line 720 is a line linking the center of the pixel 510 of interest to the center of the boundary pixel 520. A connecting line 722 is a line linking the center of the boundary pixel 520 to the center of the detection pixel 620. A connecting line 730 is a line linking the center of the pixel 510 of interest to the center of the boundary pixel 530. A connecting line 732 is a line linking the center of the boundary pixel 530 to the center of the detection pixel 630.

An angle 742 is an angle between the connecting line 720 and the connecting line 722. An angle 744 is an angle between the connecting line 730 and the connecting line 732. An angle 746 is an angle between the line linking the center of the pixel 510 of interest to the center of the detection pixel 620 and the line linking the center of the pixel 510 of interest to the center of the detection pixel 630.

Meanwhile, the angle is an angle in the region side (side opposite to the region having a color different from that of the pixel 510 of interest) composed of the pixels having the same color as that of the pixel 510 of interest. The same is true of the following.

The angle 742 is 180 degrees (that is, equal to or less than 180 degrees), the angle 744 is 180 degrees (that is, equal to or less than 180 degrees), and the angle 746 is 90 degrees (that is, equal to or less than 135 degrees). Therefore, the example of FIG. 5 satisfies the condition of (1C). Consequently, the pixel 510 of interest is extracted as a feature point.

Figure 10:
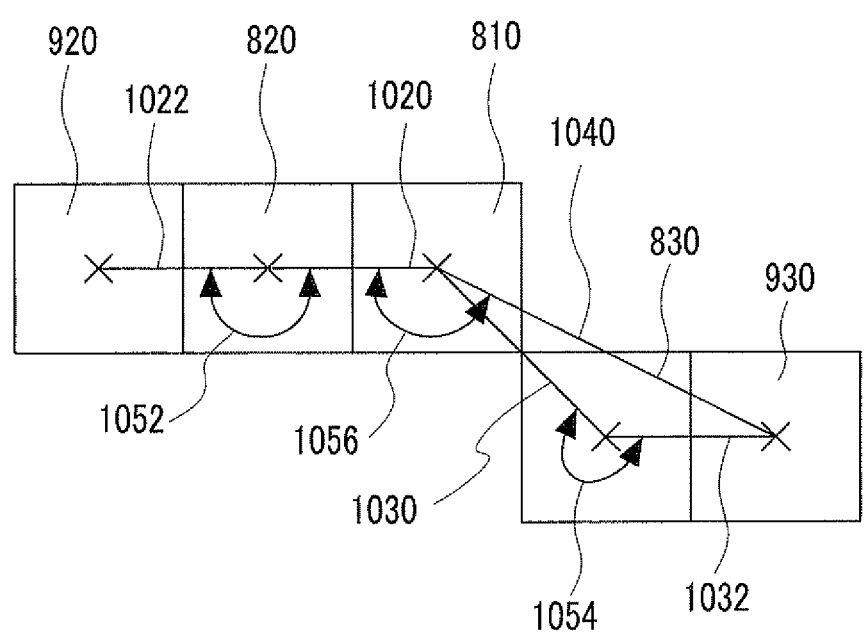
FIG. 10 is an explanatory diagram illustrating a process example for extracting the feature point.

Reference will be made to FIG. 10 to describe the lines linking the pixel of interest, the boundary pixel and the detection pixel to each other and the angle between the lines in the example of FIG. 8.

A connecting line 1020 is a line linking the center of the pixel 810 of interest to the center of the boundary pixel 820. A connecting line 1022 is a line linking the center of the boundary pixel 820 to the center of the detection pixel 920. A connecting line 1030 is a line linking the center of the pixel 810 of interest to the center of the boundary pixel 830. A connecting line 1032 is a line linking the center of the boundary pixel 830 to the center of the detection pixel 930. A connecting line 1040 is a line linking the center of the pixel 810 of interest to the center of the detection pixel 930.

An angle 1052 is an angle between the connecting line 1020 and the connecting line 1022. An angle 1054 is an angle between the connecting line 1030 and the connecting line 1032. An angle 1056 is an angle between the line linking the center of the pixel 810 of interest to the center of the detection pixel 920 and the connecting line 1040.

The angle 1052 is 180 degrees (that is, equal to or less than 180 degrees), the angle 1054 is larger than 180 degrees (that is, not equal or less than 180 degrees), and the angle 1056 is larger than 135 degrees (that is, not equal to or less than 135 degrees). Therefore, the example of FIG. 8 does not satisfy the condition of (1C). Consequently, the pixel 810 of interest is not a feature point.

(2) A feature point is extracted on the basis of the positional relationship between the feature point and plural pixels located around the feature point in a region containing the feature point. A description will be made with reference to FIGS. 11 to 14. When the following two conditions (2A) and (2B) are satisfied, it is determined that the pixel of interest is a feature point (that is, pixel existing at the corner in the region thereof). When any of the conditions are not satisfied, it is determined that the pixel is not a feature point.

(2A) The outermost circumferences of the blocks of 3×3 and 5×5 centering on the pixel of interest are detected in a predetermined direction (for example, clockwise), and one continuum within four pixels and one continuum seven pixels having the same color as that of the pixel of interest exist. Meanwhile, values within four pixels and within seven pixels are predetermined values, and may be other values.

Figure 11:
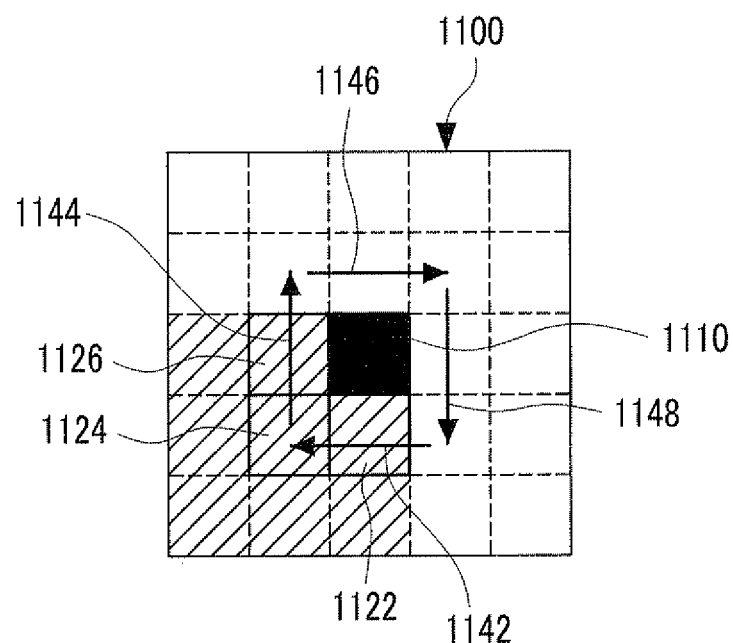
FIG. 11 is an explanatory diagram illustrating a process example for extracting the feature point.
Figure 12:
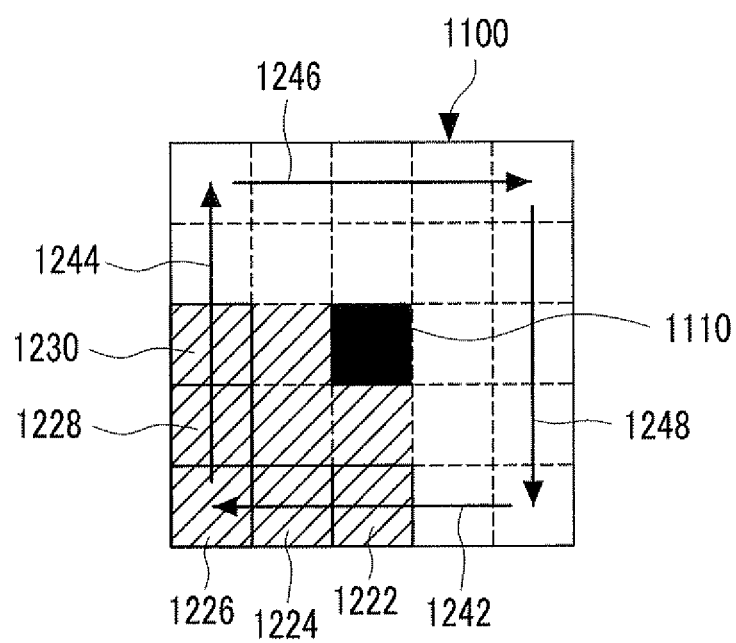
FIG. 12 is an explanatory diagram illustrating a process example for extracting the feature point.

In the example (3×3 block) of FIG. 11, the circumference of a pixel 1110 of interest is scanned in detection directions 1142, 1144, 1146, and 1148, and there is a continuum of pixels (detection pixels 1122, 1124, and 1126) having the same color (black) as that of the pixel 1110 of interest. Since the number of these pixels is three, the number of pixels is in the range of four. In the example (5×5 block) of FIG. 12, the circumference of the pixel 1110 of interest is scanned in detection directions 1242, 1244, 1246, and 1248, and there is a continuum of pixels (detection pixels 1222, 1224, 1226, 1228, and 1230) having the same color (black) as that of the pixel 1110 of interest. Since the number of these pixels is five, the number of pixels is in the range of seven. Therefore, the example of FIG. 11 satisfies the condition of (2A).

Figure 13:
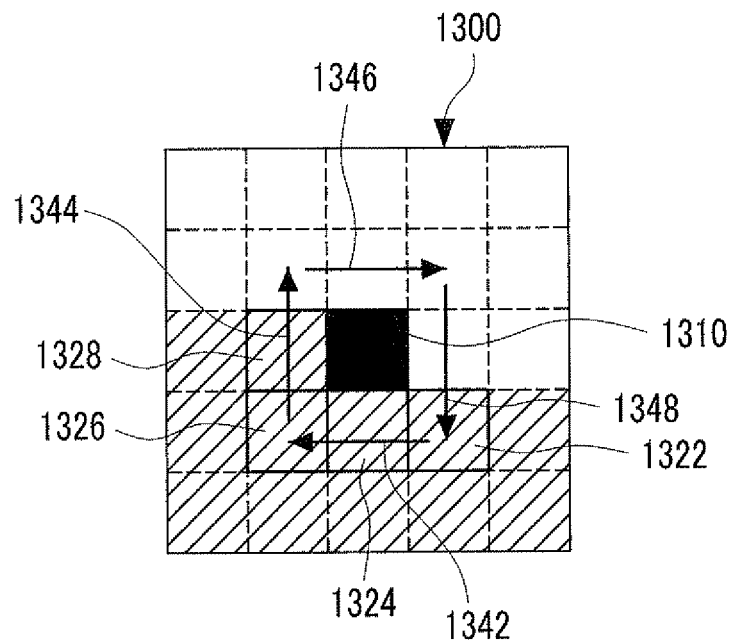
FIG. 13 is an explanatory diagram illustrating a process example for extracting the feature point.
Figure 14:
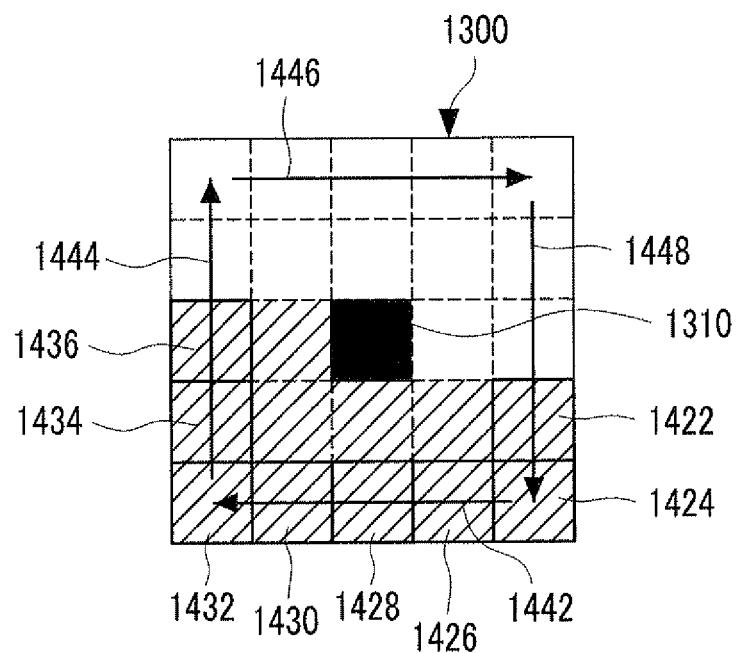
FIG. 14 is an explanatory diagram illustrating a process example for extracting the feature point.

In the example (3×3 block) of FIG. 13, the circumference of a pixel 1310 of interest is scanned in detection directions 1342, 1344, 1346, and 1348, and there is a continuum of pixels (detection pixels 1322, 1324, 1326, and 1328) having the same color (black) as that of the pixel 1310 of interest. Since the number of these pixels is four, the number of pixels is in the range of four. In the example (5×5 block) of FIG. 14, the circumference of the pixel 1310 of interest is scanned in detection directions 1442, 1444, 1446, and 1448 subsequently, and there is a continuum of pixels (detection pixels 1422, 1424, 1426, 1428, 1430, 1432, 1434, and 1436) having the same color (black) as that of the pixel 1310 of interest. Since the number of these pixels is eight, the number of pixels is not in the range of seven. Therefore, the example of FIG. 13 does not satisfy the condition of (2A).

(2B) the average position of the position of each pixel of the two continuums is in a predetermined range, setting the pixel of interest to the origin. That is, in the coordinate system in which the pixel of interest is set to the origin, the difference between the average of the coordinates of pixels constituting one continuum and the average of the coordinates of pixels constituting the other continuum is in a predetermined range. In addition, the direction from the pixel of interest may be in a predetermined range with respect to the average position of the position of each pixel of two continuums. That is, the difference between the direction from the pixel of interest for the average position of the coordinates of pixels constituting one continuum and the direction from the pixel of interest for the average position of the coordinates of pixels constituting the other continuum is in a predetermined range.

In the example (3×3 block) of FIG. 11, the average of the coordinates of the detection pixels 1122, 1124, and 1126 becomes the detection pixel 1124, and shows the lower left direction from the pixel 1110 of interest. On the other hand, in the example (5×5 block) of FIG. 12, the average of the coordinates of the detection pixels 1222, 1224, 1226, 1228, and 1230 becomes the detection pixel 1226, and shows the lower left direction from the pixel 1110 of interest. The directions are in accord with each other. Therefore, the example of FIG. 11 satisfies the condition of (2B). Consequently, the pixel 1110 of interest is extracted as a feature point.

In the example (3×3 block) of FIG. 13, the average of the coordinates of the detection pixels 1322, 1324, 1326, and 1328 becomes substantially a position of a pixel below the pixel 1310 of interest, and shows a lower direction from the pixel 1310 of interest. On the other hand, in the example (5×5 block) of FIG. 14, the average of the coordinates of the detection pixels 1422, 1424, 1426, 1428, 1430, 1432, 1434, and 1436 becomes substantially a position of a pixel below the pixel 1310 of interest, and shows a lower direction from the pixel 1310 of interest. The directions are in accord with each other. Therefore, the example of FIG. 13 satisfies the condition of (2B), but does not satisfy the condition of (2A), and thus the pixel 1310 of interest is not a feature point.

(3) A feature point is extracted on the basis of whether a region containing the feature point and a predetermined pattern are in accord with each other. For example, when patterns to be recognized as a corner in the 5×5 region are prepared as a predetermined pattern and it is in accord with any of the patterns, the central pixel may be set to a feature point. Reversely, when patterns not to be recognized as a corner in the 5×5 region are prepared as a predetermined pattern and it is not in accord with all the patterns, the central pixel may be set to a feature point.

Figure 15:
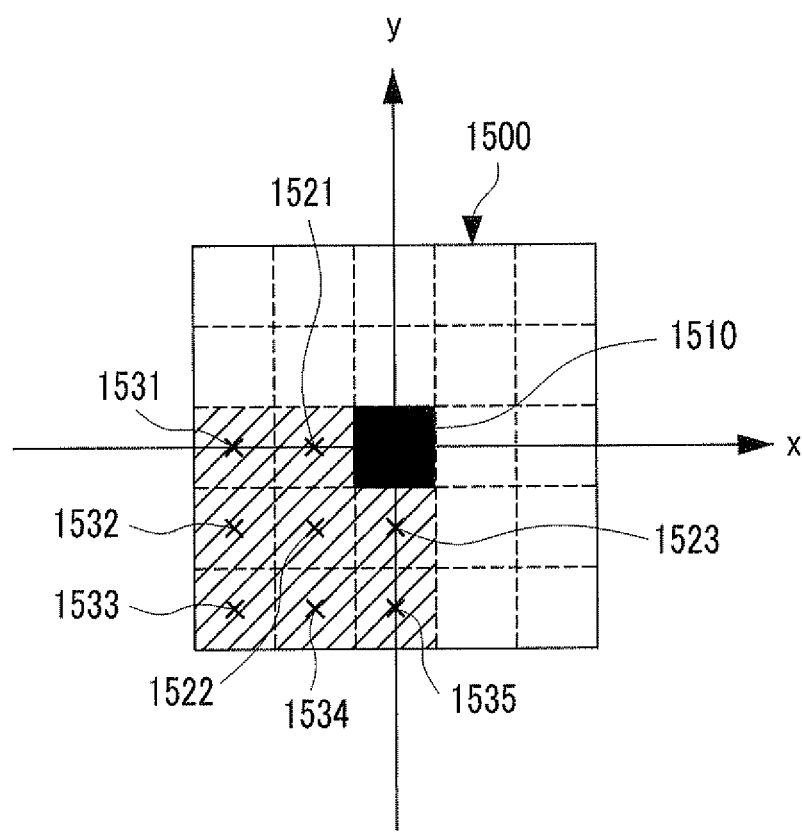
FIG. 15 is an explanatory diagram illustrating a process example for extracting the tilt direction in the feature point.

A process of extracting feature points in a tilt direction using the feature point extraction module 120 will be described with reference to FIGS. 15 and 16. For example, as shown in FIG. 15, for pixels (central pixels 1521, 1522, 1523, 1531, 1532, 1533, 1534, and 1535) having the same color as that of the pixel 1510 of interest in the 5×5 block centering on the pixel 1510 of interest, the average of the positions (coordinates) of the pixels when the pixel 1510 of interest is used as the origin is set to a tilt direction. Specifically, the tilt direction is set to {(−1, 0)+(−1, −1)+(0, −1)+(−2, 0)+(−2, −1)+(−2, −2)+(−1, −2)+(0.−2)}/8=(−9, −9)/8=(−9/8, −9/8). Naturally, the origin may be added thereto. In that case, the tilt direction is set to {(0, 0)+(−1, 0)+(−1, −1)+(0, −1)+(−2, 0)+(−2, −1)+(−2, −2)+(−1, −2)+(0.−2)}/9=(−9, −9)/9=(−1, −1).

In addition, the tilt direction may be quantized, and may be used as a vector without being quantized. Herein, in the quantization, there are an upper direction, a lower direction, a left direction, and a right direction as four-direction quantization, and there are an upper direction, a lower direction, a left direction, a right direction, an upper right direction, a lower right direction, an upper left direction, and a lower left direction as eight-direction quantization. In the example of FIG. 15, the tilt direction of the pixel 1510 of interest is a lower left direction.

Figure 16:
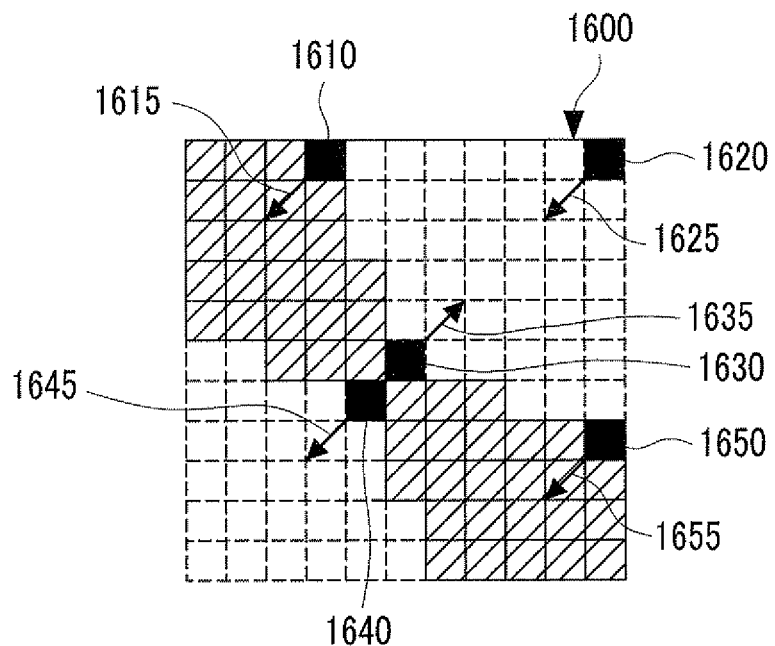
FIG. 16 is an explanatory diagram illustrating a process example for selecting the feature points.

In this manner, in the example of FIG. 16, the tilt direction of each of the feature points is extracted. A feature point 1610 of interest of a tilt direction 1615, a feature point 1620 of interest of a tilt direction 1625, a feature point 1630 of interest of a tilt direction 1635, a feature point 1640 of interest of a tilt direction 1645, and a feature point 1650 of interest of a tilt direction 1655 are extracted from the inside of a target image 1600.

As the process of extracting the tilt direction of the feature point using the feature point extraction module 120, a gradient method (image processing technique in the related art) for obtaining a gradient of brightness in the coordinates on an image may be used.

Meanwhile, in the pixels other than the feature points, the original pixel values are left intact.

In step S206, the feature point selection module 130 selects a combination of the feature points within a search region.

A process is performed in the following two steps.

In step S206-1, the feature point selection module 130 extracts the feature point having the same color as that of the feature point of interest within the search range. Herein, the search range is preferably a region containing a set of feature points. Specifically, the search range is determined in accordance with the resolution of the image and the range of the number of lines to be extracted. For example, when the minimum number of lines to be extracted with the resolution of 600 dpi is 100 lines, the range is 600/100=6, and blocks of 6×6 or more are set to a search range.

In step S206-2, the feature point selection module 130 selects the feature point satisfying the following conditions out of the extracted feature points. Meanwhile, the color of the feature point which is of interest (hereinafter, referred to as the feature point of interest) is black, and the tilt direction thereof is set to an upper right direction. However, the tilt direction of the feature point to be selected does not depend on the tilt direction of the feature point of interest. The change point from white to black is a change point when scanning in both directions of a main scanning direction and a sub scanning direction is performed.

Figure 17:
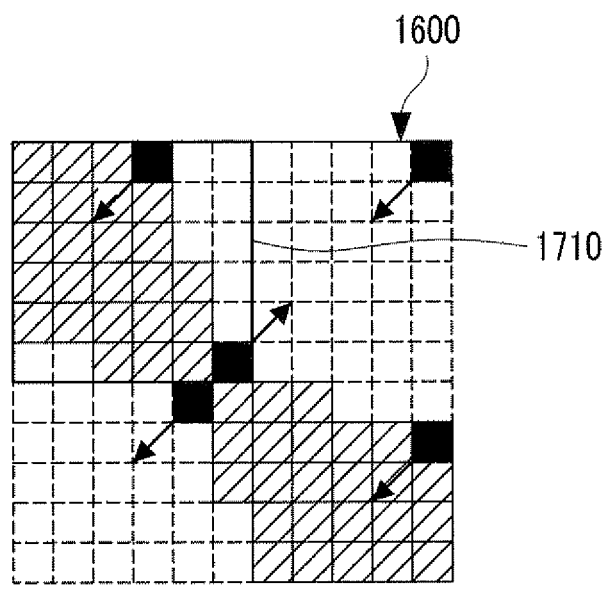
FIG. 17 is an explanatory diagram illustrating a process example for selecting the feature points.

(a) A region located at the upper left with respect to the feature point of interest is scanned in the upper left direction from the feature point of interest (that is, as the main scanning, the region is scanned in the left direction from the feature point of interest, and when reaching the left end of the region, a shift to the upper side row by one stage is performed, to repeat the scanning from the right direction to the left direction. As the sub scanning, the region is scanned in the upper direction from the feature point of interest, and when reaching the upper end of the region, a shift to the left side column by one stage is performed, to repeat the scanning from the lower direction to the upper direction), and the feature point is selected of which the tilt direction is a right direction, a lower direction or a lower right direction and which is located at the feature point side of interest from the change point from white to black. In the example of FIG. 17, the central pixel of the target image 1600 is set to a feature point of interest, and an upper left region 1710 is scanned in the upper left direction. In this case, a feature point of which the color is black and the tilt direction is a lower right direction exists in the upper left region 1710, but does not exist in the feature point side of interest from the change point from white to black, and thus the feature point is not selected.

Figure 18:
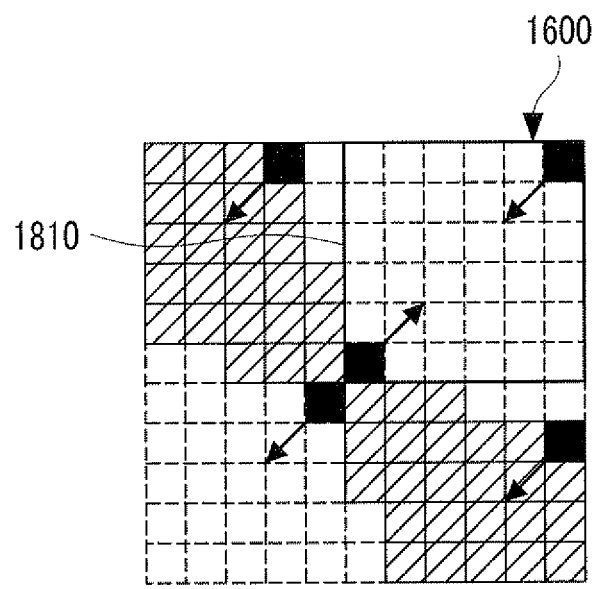
FIG. 18 is an explanatory diagram illustrating a process example for selecting the feature points.

(b) A region located at the upper right with respect to the feature point of interest is scanned in the upper right direction from the feature point of interest (that is, as the main scanning, the region is scanned in the right direction from the feature point of interest, and when reaching the right end of the region, a shift to the upper side row by one stage is performed, to repeat the scanning from the left direction to the right direction. As the sub scanning, the region is scanned in the upper direction from the feature point of interest, and when reaching the upper end of the region, a shift to the right side column by one stage is performed, to repeat the scanning from the lower direction to the upper direction), and the feature point is selected of which the tilt direction is a left direction, a lower direction or a lower left direction and which is located at the feature point side of interest from the change point from white to black. In the example of FIG. 18, the central pixel of the target image 1600 is set to a feature point of interest, and an upper right region 1810 is scanned in the upper right direction. In this case, a feature point, of which the color is black and the tilt direction is a lower left direction, which is located at the feature point side of interest from the change point from white to black exists in the upper right region 1810, and thus the feature point is selected.

Figure 19:
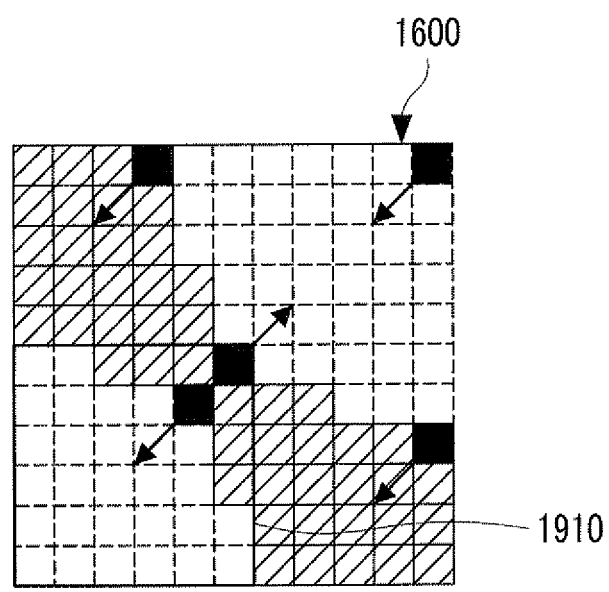
FIG. 19 is an explanatory diagram illustrating a process example for selecting the feature points.

(c) A region located at the lower left with respect to the feature point of interest is scanned in the lower left direction from the feature point of interest (that is, as the main scanning, the region is scanned in the left direction from the feature point of interest, and when reaching the left end of the region, a shift to the lower side row by one stage is performed, to repeat the scanning from the right direction to the left direction. As the sub scanning, the region is scanned in the lower direction from the feature point of interest, when reaching the lower end of the region, a shift to the left side column by one stage is performed, to repeat the scanning from the upper direction to the lower direction), and the feature point is selected of which the tilt direction is a right direction, an upper direction or an upper right direction and which is located at the feature point side of interest from the change point from white to black. In the example of FIG. 19, the central pixel of the target image 1600 is set to a feature point of interest, and a lower left region 1910 is scanned in the lower left direction. In this case, a feature point of which the color is black and the tilt direction is a lower left direction exists in the lower left region 1910, but does not exist in the feature point side of interest from the change point from white to black, and thus the feature point is not selected.

Figure 20:
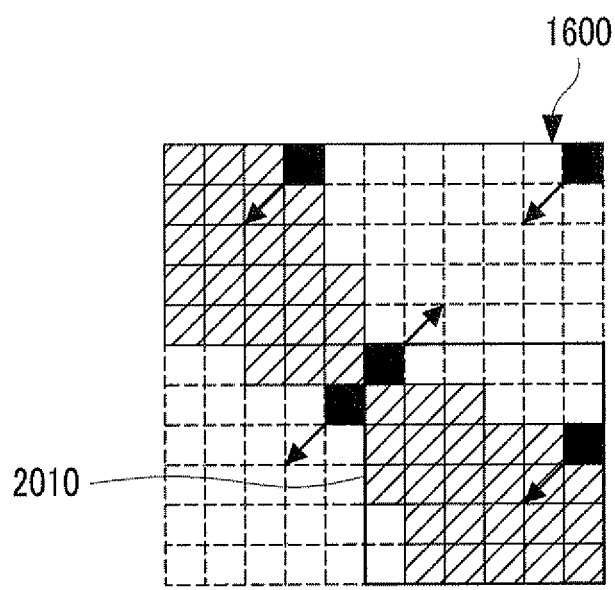
FIG. 20 is an explanatory diagram illustrating a process example for selecting the feature points.

(d) A region located at the lower right with respect to the feature point of interest is scanned in the lower right direction from the feature point of interest (that is, as the main scanning, the region is scanned in the right direction from the feature point of interest, and when reaching the right end of the region, a shift to the lower side row by one stage is performed, to repeat the scanning from the left direction to the right direction. As the sub scanning, the region is scanned in the lower direction from the feature point of interest, and when reaching the lower end of the region, a shift to the right side column by one stage is performed, to repeat the scanning from the upper direction to the lower direction), and the feature point is selected of which the tilt direction is a left direction, an upper direction or an upper left direction and which is located at the feature point side of interest from the change point from white to black. In the example of FIG. 20, the central pixel of the target image 1600 is set to a feature point of interest, and a lower right region 2010 is scanned in the lower right direction. In this case, a feature point of which the color is black and the tilt direction is a lower left direction exists in the lower right region 2010, but does not exist in the feature point side of interest from the change point from white to black, and thus the feature point is not selected.

In step S208, the feature point selection module 130 determines whether the search within the region is terminated. The process flow proceeds to step S210 when the search is terminated, and otherwise, the process flow returns to the process from step S206. That is, a combination of the feature points satisfying the conditions within the image is selected.

In the above-mentioned example of FIG. 4, a set of feature point 405 and feature point 410, a set of feature point 415 and feature point 420, a set of feature point 425 and feature point 430, and a set of feature point 440 and feature point 445 are selected within the target image 300.

Figure 21:
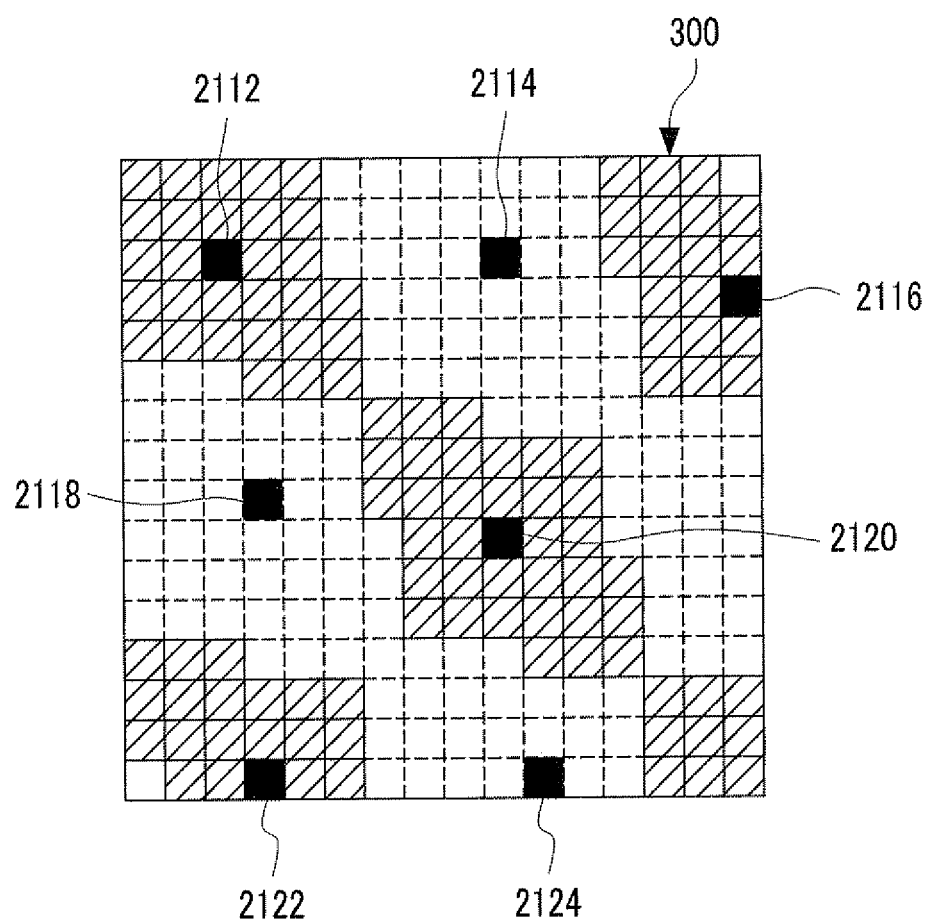
FIG. 21 is an explanatory diagram illustrating a process example for determining representative points.

In step S210, the representative point determination module 140 calculates the average of coordinate positions as a representative point in the feature point of interest and the selected feature point. In the example of FIG. 21, representative points 2112, 2114, 2116, 2118, 2120, 2122, and 2124 are calculated as representative points within the target image 300. Meanwhile, the representative point of the feature point 405 and the feature point 410 shown in the example of FIG. 4 is the representative point 2112, the representative point of the feature point 415 and the feature point 420 is the representative point 2114, the representative point of the feature point 425 and the feature point 430 is the representative point 2118, and the representative point of the feature point 440 and the feature point 445 is the representative point 2120. Meanwhile, when the corresponding feature point is only the feature point of interest without being selected, and the feature point having the same tilt direction is selected, the representative point is not calculated.

In step S212, the vector calculation module 150 calculates a vector indicating the distance and the direction to another representative point. That is, the vector calculation module 150 calculates a vector constituted by a reference representative point and a surrounding representative point. In order to calculate the vector, two representative points are extracted.

Figure 22:
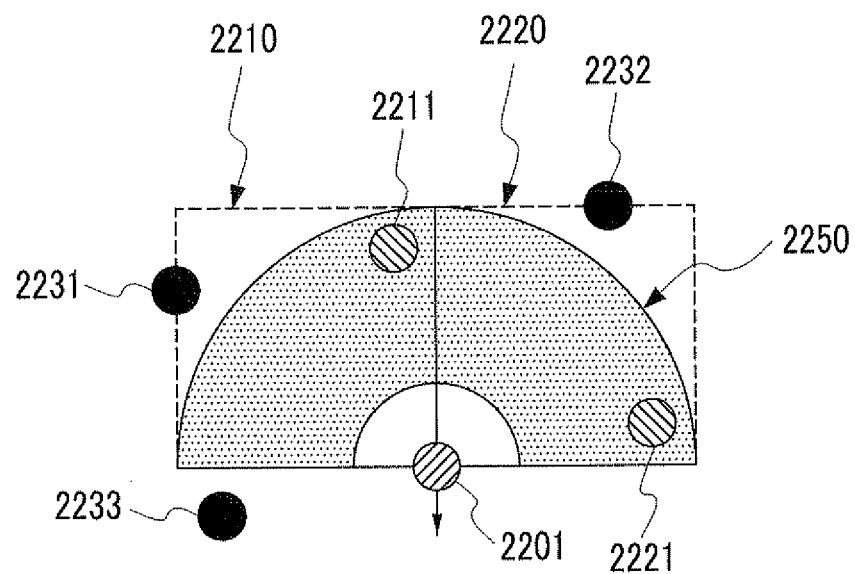
FIG. 22 is an explanatory diagram illustrating a process example for extracting the representative points.

FIG. 22 is an explanatory diagram illustrating a process example for extracting the representative points. When a certain representative point (reference representative point 2201) is used as the origin, a representative point closest to an upper left rectangular region 2210 and an upper right rectangular region 2220 of the image is extracted. As shown in the example of FIG. 22, using the reference representative point 2201 as the origin, a representative point 2211 closest to the upper left direction is extracted, and a vector constituted by the reference representative point 2201 and the representative point 2211 is extracted. Using the reference representative point 2201 as the origin, a representative point 2221 closest to the upper right direction is extracted, and a vector constituted by the reference representative point 2201 and the representative point 2221 is extracted. Therefore, a representative point 2231, a representative point 2232, and a representative point 2233 are not extracted. Herein, to be closest to the reference representative point 2201 means to be closest to a semicircular and toroidal search range 2250. A region (white region located around the reference representative point 2201 at the center side of the search range 2250) close to the reference representative point 2201 is out of the search range, and thus is not included in the representative point to be extracted. The width of the search range 2250 is a predetermined width, but is a range determined by, for example, the corresponding number of lines. More specifically, when the number of lines is 100 lines to 200 lines, the width thereof corresponds to 12 pixels to 24 pixels. In addition, the semicircular range in a radius of 12 pixels from the reference representative point 2201 is out of the target.

In addition, although the upper left direction and the upper right direction are exemplified, a combination of the upper right direction and the lower right direction, a combination of the lower right direction and the lower left direction, and a combination of the lower left direction and the upper left direction may be used.

Figure 23:
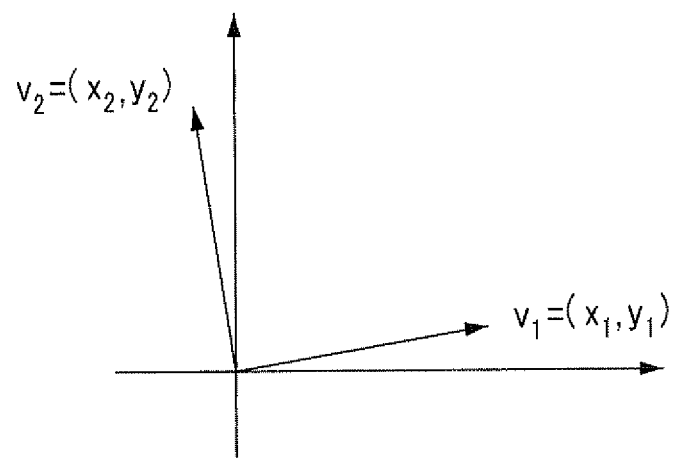
FIG. 23 is an explanatory diagram illustrating a calculation process example of vectors.

FIG. 23 is an explanatory diagram illustrating a calculation process example of vectors. In the example of FIG. 22, the extracted vector is shown. That is, a vector specified by the reference representative point 2201 and the representative point 2221 is set to v1, and a vector specified by the reference representative point 2201 and the representative point 2211 is set to v2.

Meanwhile, when the gap between predetermined angles (for example, 0 degree, 45 degrees, and 90 degrees) is within a predetermined number of pixels (for example, 1 pixel), the vector may be extracted as a representative point of the predetermined angle.

In addition, in the calculation of the vector, the calculation may be performed on the case where all the representative points are set to the reference representative point (origin), the calculation may be performed on the case where a predetermined number of representative points are set to the reference representative point (origin), and the calculation may be performed on the case where the representative points located at a predetermined position (which may be a position randomly determined) are set to the reference representative point (origin).

In step S214, the screen line number and angle extraction module 160 sums up the vectors, and extracts the number of screen lines and the angle. The ending point (representative point which is not the reference representative point (origin)) of the vector calculated in step S212 is plotted. That is, in the coordinate system illustrating in FIG. 23, the position of the ending point is counted.

Figure 24:
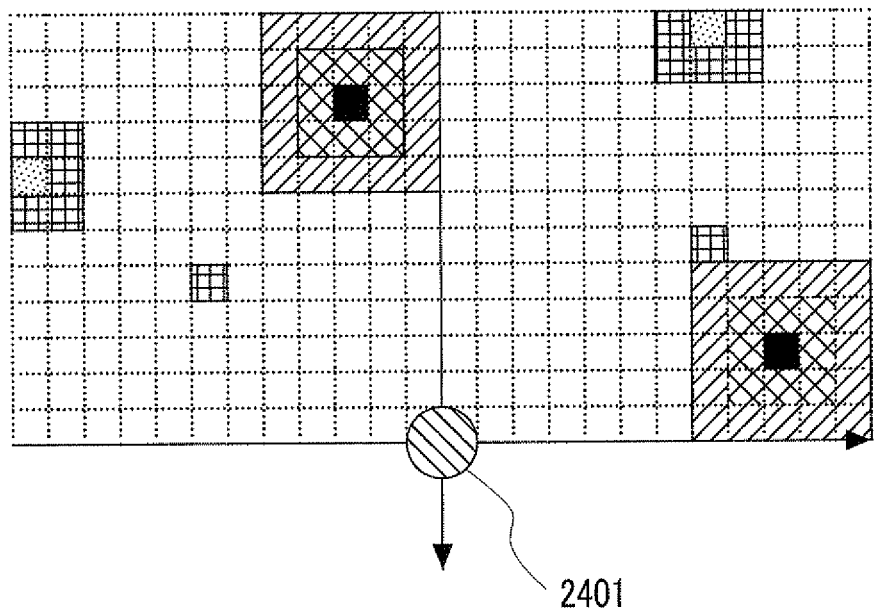
FIG. 24 is an explanatory diagram illustrating a distribution example of the vectors.

FIG. 24 is an explanatory diagram illustrating a distribution example of the vectors with respect to a dot concentration-type dither screen. In the coordinate system in which the reference representative point 2401 is used as the origin, the position having a dark color shows a large number of distributions. A large number of distributions are shown at the lower right within the rectangle located in the upper right direction with respect to the reference representative point 2401, and a large number of distributions are shown at the upper right within the rectangle located in the upper left direction within the reference representative point 2401.

Figure 25:
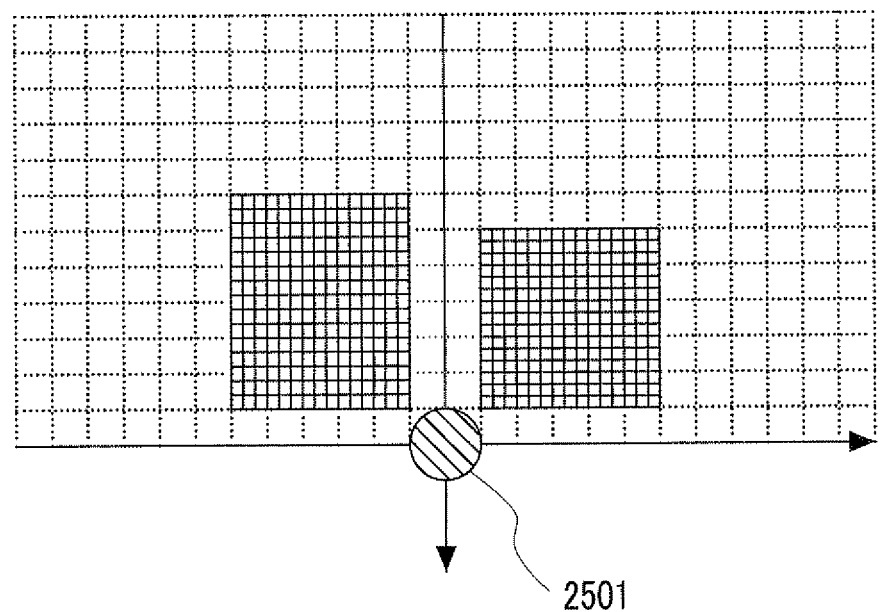
FIG. 25 is an explanatory diagram illustrating a distribution example of the vectors.

FIG. 25 is an explanatory diagram illustrating a distribution example of the vectors with respect to a dot distribution-type dither screen, an error diffusion screen, and an FM screen. In the coordinate system in which the reference representative point 2501 is used as the origin, the position having a dark color shows a large number of distributions. There is no position having a remarkably large number of distributions as compared to the example of FIG. 24.

The position of a peak is extracted from these distributions. Meanwhile, whether the position is a peak or not is determined by comparing (1) the difference between a primary value and a secondary value, (2) the ratio occupied by the whole, and the like with a predetermined threshold (for example, threshold or more). In addition, it is determined by comparing the S/N ratio of the maximum value in a local range with a predetermined threshold (for example, threshold or more) (see JP-A-2005-221276). It is determined by comparing the X (Chi) two-distribution Q value with a predetermined threshold (for example, threshold or more) (see JAXA publication).

Figure 26A:
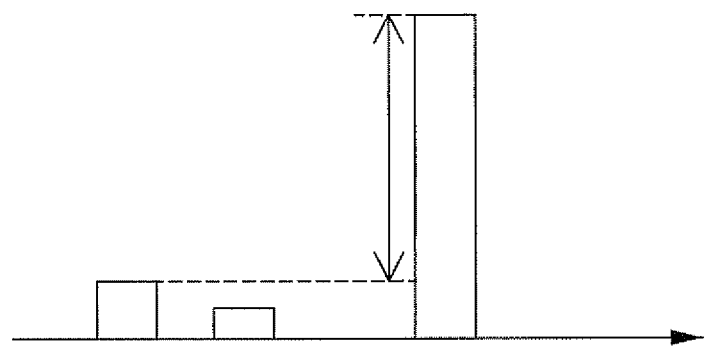
FIGS. 26A and 26B are explanatory diagrams illustrating a process example for determining a peak.
Figure 26B:
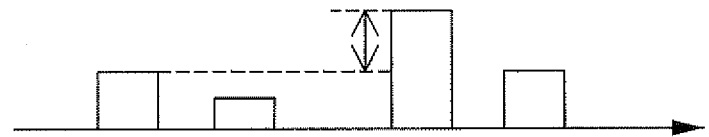

FIGS. 26A and 26B are explanatory diagrams illustrating a process example for determining a peak using primary value and a secondary value. In the histogram examples of FIGS. 26A and 26B, the coordinate position is shown in the horizontal axis, and the number of distributions is shown in the vertical axis. The histogram example of FIG. 26A corresponds to the example of FIG. 24, and is a diagram in which the difference between the primary value and the secondary value is a threshold or more, and the determination as a peak is made. In the histogram example of FIG. 26B corresponds to the example of FIG. 25, and is a diagram in which the difference between the primary value and the secondary value is less than a threshold, and the determination as a peak may not be made. In this manner, when the peak may not be extracted, it may be determined not to be a dot concentration-type dither screen. The output module 170 may output the purport.

Meanwhile, the dot distribution-type dither screen, the error diffusion screen, and the FM screen may not extract the peak because the distance between the central points is short, the distribution range changes due to the concentration, and the direction is not constant. In addition, the line screen becomes the same as the dot distribution-type dither screen due to the concentration, or each line of the screen becomes one huge region, and thus the peak may not be extracted.

The number of screen lines and the angle are calculated from the position of the peak.

The number of screen lines calculates using the distance between the origin (reference representative point) and the position of the peak, and the resolution. The distance between the origin and the position of the peak is equivalent to the size of the vector, and is a distance between the representative points (the centers of halftone dots or the like) determined by the representative point determination module 140. The actual distance (for example, of which the unit is inch or the like) is calculated using the distance and the resolution, and the number of lines (density of the halftone dot per unit length) is calculated by the inverse number thereof.

In addition, the angle of the screen is equivalent to the angle of the vector, and the angle between the line constituted by the origin and the position of the peak (for example, peak located in the rectangle on the upper right with respect to the origin) and the reference line (for example, horizontal line (x-axis)) is the angle of the screen.

In addition, here, when the difference between the extracted number of screen lines or angle and a predetermined number of lines or angle is in a predetermined relationship, the screen line number and angle extraction module 160 may extract the extracted number of screen lines or angle as the predetermined number of lines or angle.

In step S216, the output module 170 outputs the number of screen lines and the angle. The image processing apparatus receiving the number of screen lines and the angle performs image processing. For example, there is image processing such as multivalued processing and processing for separating a letter region from an image region of a photograph or the like.

FIGS. 27A to 27D are explanatory diagrams illustrating an example of a target image. In the image processing apparatus of the exemplary embodiment, a region shown below may be used as a target with respect to an image 2700 received by the receiving module 110.

In the example of FIG. 27A, the entirety of an image region 2710 of the image 2700 is used as a target. As compared to other examples, the accuracy is high but the page memory is required.

In the example of FIG. 27B, a multi-line region 2720 of the image 2700 is used as a target. The multi-line region 2720 may be a predetermined region, and may be a region in which a halftone region is extracted by image processing so that the halftone region is contained. When the above-mentioned example is compared to the example of FIG. 27A, the accuracy decreases but the smaller amount of memory is required. For example, this example is suitable for the speedup using hardware.

In the example of FIG. 27C, a sample number obtainment region 2730 of the image 2700 is used as a target. The sample number obtainment region 2730 is a region having a predetermined number of samples (the number of vectors or the number of distributions mentioned above) or more, and when reaching the sample number, the process is terminated. When the above-mentioned example is compared to the example of FIG. 27A, the accuracy decreases but the processing time is shortened. For example, this example is suitable for the speedup using software.

In the example of FIG. 27D, a screen region 2740 and a screen region 2745 of the image 2700 are used as a target. In the selection of the screen region 2740 and the screen region 2745, the selection may be performed using a mouse, keyboard, a touch panel or the like of an operator, and the halftone region may be selected by image processing. Moreover, in this case, the number of screen lines and the angle may be calculated for each selected region. Therefore, it is also possible to deal with a case where there is a region in which screens having a different type are used in one image.

Figure 28:
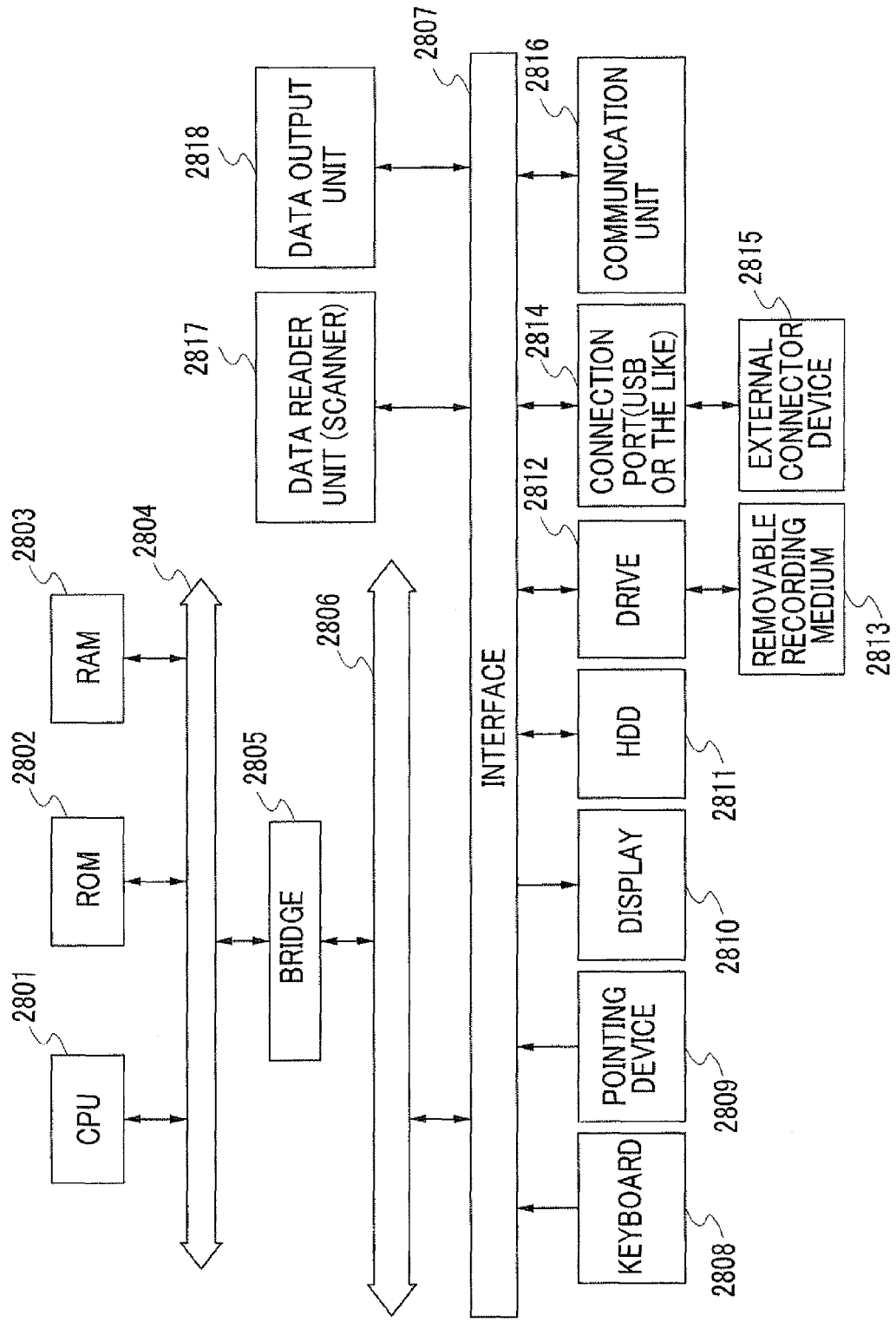
FIG. 28 is a block diagram illustrating a hardware configuration example of a computer for realizing the exemplary embodiment.

Reference will be made to FIG. 28 to describe a hardware configuration example of the image processing apparatus according to the exemplary embodiment. The configuration shown in FIG. 28 is constituted by, for example, a personal computer (PC) and the like, and shows a hardware configuration example including a data readout unit 2817 such as a scanner, and a data output unit 2818 such as a printer.

A CPU (Central Processing Unit) 2801 is a control portion that executes processes according to a computer program in which execution sequences of various types of modules set forth in the above-mentioned embodiment, that is, each of the modules such as the feature point extraction module 120, the feature point selection module 130, the representative point determination module 140, the vector calculation module 150, and the screen line number and angle extraction module 160 are described.

A ROM (Read Only Memory) 2802 stores programs or operation parameters used by the CPU 2801. A RAM (Random Access Memory) 2803 stores programs used in execution of the CPU 2801 or parameters appropriately changing at the execution thereof. They are connected to each other by a host bus 2804 constituted by a CPU bus and the like.

The host bus 2804 is connected to an external bus 2806 such as a PCI (Peripheral Component Interconnect/Interface) bus through a bridge 2805.

A pointing device 2809 such as a keyboard 2808 and a mouse is an input device operated by an operator. A display 2810 is a liquid crystal display, a CRT (Cathode Ray Tube) or the like, and displays various types of information as texts or image information.

An HDD (Hard Disk Drive) 2811 has a built-in hard disk, drives the hard disk, and records or regenerates programs executed by the CPU 2801 or information. The received image, the coordinate of the extracted feature point, the direction thereof, the vector, the number of screen lines, the angle and the like are stored in the hard disk. Further, various types of computer programs such as other various types of data processing programs are stored therein.

A drive 2812 reads out data or programs recorded in a removable recording medium 2813 such as a magnetic disk, an optical disc, a magneto-optical disc, or a semiconductor memory which are mounted therein, and is supplies the data or the programs to the RAM 2803 connected through an interface 2807, the external bus 2806, the bridge 2805, and the host bus 2804. The removable recording medium 2813 may also be used as a data recording region similar to the hard disk.

A connection port 2814 is a port for connecting an external connection device 2815, and has a connection portion such as USB, IEEE 1394 and the like. The connection port 2814 is connected to the CPU 2801 or the like through the interface 2807, the external bus 2806, the bridge 2805, the host bus 2804 or the like. The communication unit 2816 is connected to a network, and performs data communication with the outside. The data readout unit 2817 is, for example, a scanner, and performs readout processing of a document. The data output unit 2818 is, for example, a printer, and performs output processing of document data.

Meanwhile, the hardware configuration of the image processing apparatus shown in FIG. 28 shows one configuration example. The exemplary embodiment is not limited to the configuration shown in FIG. 28, and is preferably a configuration capable of executing the modules described in the exemplary embodiment. For example, a portion of the modules may be constituted by a dedicated hardware (for example, application specific integrated circuit (ASIC) or the like), a portion of the modules may be connected through the communication line located in an external system, and plural systems shown in FIG. 28 may be connected to each other through the communication line so as to cooperate with each other. In addition, the modules may be incorporated into a copying machine, a facsimile, a scanner, a printer, a multi-function machine (image processing apparatus having any two or more of functions of a scanner, a printer, a copying machine, a facsimile or the like) or the like.

Meanwhile, techniques described in the related art as the processing contents of each module may be adopted.

Meanwhile, the program described above may be stored in a recording medium and provided, and the program may be provided through a communication unit. In that case, for example, the program described above may be comprehended as an invention of "computer readable recording medium having a program recorded thereon".

Herein, "computer readable recording medium having a program recorded thereon" is referred to as a computer readable recording medium on which a program is recorded, used for installation and execution of the program, distribution of the program, and the like.

Meanwhile, the recording medium includes, for example, a digital versatile disk (DVD), "DVD-R, DVD-RW, DVD-RAM and the like" which are standards formulated in the DVD Forum, "DVD+R, DVD+RW and the like" which are standards formulated in DVD+RW, a compact disc (CD), a read only memory (CD-ROM), CD recordable (CD-R), CD rewritable (CD-RW), Blu-ray Disc (registered trademark), a magneto-optical disc (MO), a flexible disk (FD), a magnetic tape, a hard disk, a read only memory (ROM), an electrically erasable programmable read only memory (EEPROM (registered trademark)), a flash memory, a random access memory (RAM), and the like.

The above-mentioned programs or a portion thereof may be recorded in the recording medium and preserved or distributed. In addition, transmission thereof may be performed, for example, by the communication, using wired networks or wireless communication networks used in a local area network (LAN), a metropolitan area network (MAN), a wide area network (WAN), the Internet, Intranet, Extranet and the like, or a transmission medium of a combination thereof. In addition, deliveries thereof may be performed through carrier waves.

Further, the above-mentioned program may be a portion of another program, or may be recorded in a recording medium together with a separate program. In addition, the program may be divided and recorded in plural recording media. In addition, the program may be recorded in any of compressed or encrypted formats capable of being recovered.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a feature point extraction unit that extracts feature points which are pixels located at the corner of a region within an image and directions indicating a positional relationship of the feature points in the region;
 a selection unit that selects the feature point and a set of feature points corresponding to the feature point, on the basis of a color of the feature point extracted by the feature point extraction unit, a position of the feature point, and a direction in the feature point;
 a representative point determination unit that determines a representative point representing a region, on the basis of the set of feature points selected by the selection unit;
 a vector calculation unit that calculates a vector composed of two representative points, on the basis of the representative points determined by the representative point determination unit; and
 a screen line number and angle extraction unit that extracts the number of screen lines and an angle used in the image, on the basis of a distribution of the vectors calculated by the vector calculation unit.

2. The image processing apparatus according to claim 1, wherein the feature point extraction unit extracts the feature point on the basis of an angle between lines linking the feature point to a plurality of pixels located around the feature point in a region containing the feature point, extracts the feature point on the basis of a positional relationship between the feature point and the plurality of pixels located around the feature point in the region containing the feature point, or extracts the feature point on the basis of whether a region containing the feature point and a predetermined pattern are in accord with each other.

3. The image processing apparatus according to claim 2, wherein the feature point extraction unit extracts a direction determined by a positional relationship between the feature point and a plurality of pixels located around the feature point in a region containing the feature point.

4. The image processing apparatus according to claim 3, wherein when a difference between the extracted number of screen lines or angle and a predetermined number of lines or angle is in a predetermined relationship, the screen line number and angle extraction unit extracts the extracted number of screen lines or angle as the predetermined number of lines or angle.

5. The image processing apparatus according to claim 4, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

6. The image processing apparatus according to claim 3, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

7. The image processing apparatus according to claim 2, wherein when a difference between the extracted number of screen lines or angle and a predetermined number of lines or angle is in a predetermined relationship, the screen line number and angle extraction unit extracts the extracted number of screen lines or angle as the predetermined number of lines or angle.

8. The image processing apparatus according to claim 7, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

9. The image processing apparatus according to claim 2, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

10. The image processing apparatus according to claim 1, wherein the feature point extraction unit extracts a direction determined by a positional relationship between the feature point and a plurality of pixels located around the feature point in a region containing the feature point.

11. The image processing apparatus according to claim 10, wherein when a difference between the extracted number of screen lines or angle and a predetermined number of lines or angle is in a predetermined relationship, the screen line number and angle extraction unit extracts the extracted number of screen lines or angle as the predetermined number of lines or angle.

12. The image processing apparatus according to claim 11, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

13. The image processing apparatus according to claim 10, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

14. The image processing apparatus according to claim 1, wherein when a difference between the extracted number of screen lines or angle and a predetermined number of lines or angle is in a predetermined relationship, the screen line number and angle extraction unit extracts the extracted number of screen lines or angle as the predetermined number of lines or angle.

15. The image processing apparatus according to claim 14, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

16. The image processing apparatus according to claim 1, wherein the vector calculation unit selects a reference representative point of the representative points determined by the representative point determination unit as a first representative point, selects a representative point between a first distance and a second distance predetermined from the reference representative point as a second representative point, and calculates a vector composed of the first representative point and the second representative point.

17. The image processing apparatus according to claim 16, wherein the vector calculation unit selects the representative point between the first distance and the second distance as the second representative point within rectangular regions adjacent to each other with the first representative point used as a corner.

18. A non-transitory computer readable medium storing a program causing a computer to function as:
  a feature point extraction unit that extracts feature points which are pixels located at the corner of a region within an image and directions indicating a positional relationship of the feature points in the region;
  a selection unit that selects the feature point and a set of feature points corresponding to the feature point, on the basis of a color of the feature point extracted by the feature point extraction unit, a position of the feature point, and a direction in the feature point;
  a representative point determination unit that determines a representative point representing a region, on the basis of the set of feature points selected by the selection unit;

a vector calculation unit that calculates a vector composed of two representative points, on the basis of the representative points determined by the representative point determination unit; and a screen line number and angle extraction unit that extracts the number of screen lines and an angle used in the image, on the basis of a distribution of the vectors calculated by the vector calculation unit.

19. A method for processing images by at least one processor, the at least one processor configured to perform the steps of:

extracting feature points which are pixels located at the corner of a region within an image and directions indicating a positional relationship of the feature points in the region;

selecting the feature point and a set of feature points corresponding to the feature point, on the basis of a color of the extracted feature point, a position of the feature point, and a direction in the feature point;

determining a representative point representing a region, on the basis of the selected set of feature points;

calculating a vector composed of two representative points, on the basis of the determined representative point; and extracting the number of screen lines and an angle used in the image, on the basis of a distribution of the calculated vectors.

\* \* \* \* \*